(12) United States Patent
Shanmugam

(10) Patent No.: US 9,960,911 B2
(45) Date of Patent: May 1, 2018

(54) SYSTEM AND METHOD FOR SECURING WIRELESS COMMUNICATION THROUGH PHYSICAL LAYER CONTROL AND DATA CHANNEL

(71) Applicant: Signalchip Innovations Private Limited, Bangalore (IN)

(72) Inventor: Kandasamy Shanmugam, Bangalore (IN)

(*) Notice: Subject to any disclaimer, the term of this patent is extended or adjusted under 35 U.S.C. 154(b) by 0 days. days.

(21) Appl. No.: 15/260,789

(22) Filed: Sep. 9, 2016

(65) Prior Publication Data
US 2017/0078088 A1 Mar. 16, 2017

(30) Foreign Application Priority Data
Sep. 11, 2015 (IN) .......................... 4847/CHE/2015

(51) Int. Cl.
| | | |
|---|---|---|
| H04L 9/32 | (2006.01) | |
| H04L 9/06 | (2006.01) | |
| H04L 9/12 | (2006.01) | |
| H04L 9/14 | (2006.01) | |
| H04L 9/08 | (2006.01) | |
| H04W 12/04 | (2009.01) | |
| H04W 12/02 | (2009.01) | |

(Continued)

(52) U.S. Cl.
CPC .......... *H04L 9/0662* (2013.01); *H04L 9/0863* (2013.01); *H04L 9/12* (2013.01); *H04L 9/14* (2013.01); *H04W 12/02* (2013.01); *H04W 12/04* (2013.01); *H04L 5/0007* (2013.01); *H04L 2209/80* (2013.01); *H04W 48/12* (2013.01); *H04W 84/042* (2013.01)

(58) Field of Classification Search
CPC . H04L 9/06; H04L 9/0662; H04L 9/08; H04L 9/14; H04L 9/12; H04W 12/04; H04W 12/08

See application file for complete search history.

(56) References Cited

U.S. PATENT DOCUMENTS

2002/0094085 A1* 7/2002 Roberts ................. H04L 9/0869
380/262
2006/0126841 A1* 6/2006 Pal .......................... H04L 63/04
380/255

(Continued)

OTHER PUBLICATIONS

Engline machine generated translation of foreign application JP 2004-226852.*

*Primary Examiner* — David Le
(74) *Attorney, Agent, or Firm* — The Law Office of Austin Bonderer, PC; Austin Bonderer

(57) ABSTRACT

A system for securing wireless communication between a transmitter and a receiver through a physical layer control and a data channel is disclosed. The transmitter includes a pseudo random sequence generator module and an encryption module. The pseudo random sequence generator module receives a protocol input, and an additional input. The pseudo random sequence generator module initializes an initial state with the protocol input and the additional input to obtain a pseudo random sequence code. The encryption module receives a ciphering key and encrypts the pseudo random sequence code with the ciphering to obtain an encrypted secure scrambling code to secure the system through the physical layer control and the data channel.

10 Claims, 10 Drawing Sheets

(51) Int. Cl.
    *H04W 84/04*     (2009.01)
    *H04L 5/00*     (2006.01)
    *H04W 48/12*     (2009.01)

(56) References Cited

U.S. PATENT DOCUMENTS

| | | | |
|---|---|---|---|
| 2010/0166178 A1* | 7/2010 | Berggren | H04L 63/0442 380/42 |
| 2011/0122843 A1* | 5/2011 | Iwamura | H04W 12/04 370/331 |
| 2014/0025736 A1* | 1/2014 | Wang | H04L 45/46 709/204 |
| 2014/0254730 A1* | 9/2014 | Kim | H04B 15/00 375/346 |

* cited by examiner

| KEY 902 | GENERATED WITH 904 | USED FOR SCRAMBLING 906 |
|---|---|---|
| DL BASIC | PHYSICAL ID,SFN,SF,MIB,USIM | MINIMUM SYSTEM INFORMATION |
| DL COMMON | HIGHER LAYER SIGNALLING,USIM | OTHER SYSTEM INFORMATION AND COMMON CHANNELS |
| DL USER | HIGHER LAYER SIGNALLING,USIM | USER SPECIFIC DOWNLINK DATA |
| UL USER | HIGHER LAYER SIGNALLING,USIM | USER SPECIFIC UPLINK DATA |

FIG. 9

SYSTEM AND METHOD FOR SECURING WIRELESS COMMUNICATION THROUGH PHYSICAL LAYER CONTROL AND DATA CHANNEL

CROSS-REFERENCE TO RELATED APPLICATIONS

This application claims priority to Indian Patent Application number 4847/CHE/2015 filed on Sep. 11, 2015, the complete disclosure of which, in its entirely, is herein incorporated by reference.

BACKGROUND

Technical Field

The embodiments herein generally relates to securing wireless communication and, more particularly, to a system and method for securing wireless communication by adding ciphering at a physical layer control and data channel.

Description of the Related Art

Several techniques exist for securing a digital wireless communication system. One of the known techniques of securing in digital wireless communication system is ciphering which is a procedure designed to protect a subscriber identity and data. Typically, ciphering is used in data transmission systems to prevent a transmitted data from being accessed by an unauthorized user. Also, the ciphering technique has been commonly employed in wireless communication, and has grown significantly in the past few years. Ciphering is the process of altering voice or data information with an intention of preventing its access or usage by unauthorized recipients. Ciphering involves use of a data processing algorithm (e.g. formula program) that uses one or more secret keys that both a sender and a recipient of the information can use to encrypt or decrypt respectively the information. Without the encryption algorithm and key(s), unauthorized listeners cannot decode the data or messages.

In wideband code division multiple access (WCDMA), the ciphering is performed at radio link control (RLC) layer. In long term evolution (LTE), the ciphering is performed at Packet Data Convergence Protocol (PDCP). However, in wideband code division multiple access, long term evolution, and other similar systems there is no further ciphering done at lower layers as the operation of the wideband code division multiple access, the long term evolution, and other similar systems involve one or more steps to be performed at the lower layers before the ciphering is initiated. As a result, headers and control information present in the lower layers such as medium access control (MAC) and various physical layer channels are not ciphered. The non-ciphered headers and control information present in the lower layers may be received and decoded by an unauthorized attacker to device an attack.

FIG. 1 illustrates a diagrammatic process flow 100 depicting a process of ciphering in long term evolution (LTE) systems where ciphering is performed at Packet Data Convergence Protocol (PDCP) layer and lower layers to add header and other data (which needs to be transmitted) without any encryption. The diagrammatic process flow 100 depicts an entity containing protocol layers that includes a Packet Data Convergence Protocol (PDCP) layer 102, a Radio Link Control (RLC) layer 104, a medium access control (MAC) layer 106, a physical layer (PHY) 108, a PDCP (Packet Data Convergence Protocol) PDU (protocol data unit) 110, an Radio Link Control header (RLC HDR) with PDCP PDU 112, a medium access control header (MAC HDR) with PDCP PDU 114, and a physical data and control channels 116. In the long term evolution systems, the ciphering is not performed at lower layers.

FIG. 2 illustrates a typical scrambling code generator 202 with an output of the scrambling generator is XORed (exclusive ORed) along with the data that needs to be transmitted for randomization. The typical scrambling code generator 202 receives protocol inputs and generates a scrambling code from the protocol inputs for randomization. The protocol inputs are as described in the wireless communication standard specifications, which may vary for each type of channel. For example, in the long term evolution system, the protocol inputs may be a System/Radio Frame Number, a Sub-frame Number, a Radio Network Temporary Identified (RNTI), etc. The wideband code division multiple access (WCDMA) and long term evolution (LTE) may use scrambling codes. The scrambling code generator 202 receives the protocol inputs such as a physical cell ID, a system frame number, and the like to generate a seed. The seed is used to initialize a seed state to generate a scrambling code. The scrambling code is XORed (exclusive ORed) with data that needs to be transmitted to randomize transmitted bits. The data that is transmitter may be specified in the specification of the wideband code division multiple access (WCDMA) and the long term evolution (LTE) system. The scrambling code generator 202 ensures that both a transmitter and a receiver are aligned to use the same inputs to generate the same scrambling code for transmission and reception. The XOR (exclusive OR) operation is reversible. For example, the receiver may recover the data bits from the received scrambling code. The wireless communication system may employ the scrambling code to randomize the transmitted bits at the physical layer.

Accordingly there remains a need for a system and method for securing wireless communication through physical layer control and data channels.

SUMMARY

In view of the foregoing, an embodiment herein provides a system for securing wireless communication between a transmitter and a receiver through a physical layer control and a data channel. The system includes a transmitter memory unit that stores a set of transmitter modules, and a transmitter processor. The transmitter processor executes the set transmitter modules. The set of transmitter modules includes a pseudo random sequence generator module and an encryption module. The pseudo random sequence generator module, implemented by the transmitter processor, receives a protocol input and an additional input, and initializes its initial state with the protocol input and the additional input to obtain a pseudo random sequence code. The pseudo random sequence code includes plain text. The encryption module, implemented by the transmitter processor, receives a ciphering key and encrypts the pseudo random sequence code with the ciphering key to obtain an encrypted secure scrambling code to secure the system through the physical layer control and the data channel.

In one embodiment, the system for securing wireless communication between a transmitter and a receiver through a physical layer control and a data channel includes a receiver memory unit and a receiver processor. The receiver processor is being configured to (i) obtain a master information by detecting the system through synchronization or a beacon channel; (ii) generate a downlink basic key by combining a user shared secret with the master information; (iii) decrypt a minimum amount of broadcast or a system information required for authentication through the downlink basic key to obtain descrambled information; (iv) generate one or more of keys through authentication of said descrambled information with said user shared secret.

In one aspect, a method for securing wireless communication between a transmitter and a receiver through a physical layer control and a data channel is provided. The method includes the following steps: (a) receiving a protocol input and an additional input, at the transmitter; (b) generating a pseudo random sequence code, at said transmitter, by performing initialization of an initial state with said protocol input and said additional input; (c) receiving a ciphering key, at said transmitter; (d) generating an encrypted secure scrambling code based on (i) the ciphering key, and (ii) the a pseudo random sequence code; (e) encrypting the physical layer control and the data channel by replacing a known scrambling code with the encrypted secure scrambling code in the physical layer control and the data channel for securing a wireless communication system.

In one embodiment, the method further includes the following steps: (i) detecting the wireless communication system through synchronization or a beacon channel to obtain a master information, at said receiver, from the physical layer control and the data channel, wherein the master information includes at least one of a physical ID, a system frame number (SFN), a Sub-frame (SF), and a master information block (MIB); (ii) generating a downlink basic key, at said receiver, by combining a user shared secret with the master information, wherein the user shared secret is a password or a key fob and the downlink basic key is a first level downlink key; (iii) decrypting, at the receiver, a minimum amount of broadcast or system information required for authentication through said downlink basic key to obtain descrambled information; (iv) generating one or more of keys, at the receiver, through authentication of the descrambled information with the user shared secret, wherein the one or more of keys is selected from a downlink common key, a downlink user key, and an uplink user key; (v) transmitting data that includes the encrypted secure scrambling code associated with a first user in any part of the data channel and the data channel is descrambled by all users; (vi) grouping the data intended for different purpose or users and adding a separate ciphering key for each group; (vii) generating the encrypted secure scrambling code for complete length of the channel for each key, wherein the each secure scrambling code is applied only to a portion containing the data protected by said key; and, (viii) concatenating differently scrambled data bits preserving their position in a common channel and transmitting a resultant bit through said common/shared channel.

BRIEF DESCRIPTION OF THE DRAWINGS

The embodiments herein will be better understood from the following detailed description with reference to the drawings, in which:

FIG. 9 illustrates a tabular view of a plurality of types of keys, according to an embodiment herein.

DETAILED DESCRIPTION OF PREFERRED EMBODIMENTS

Figure 1:
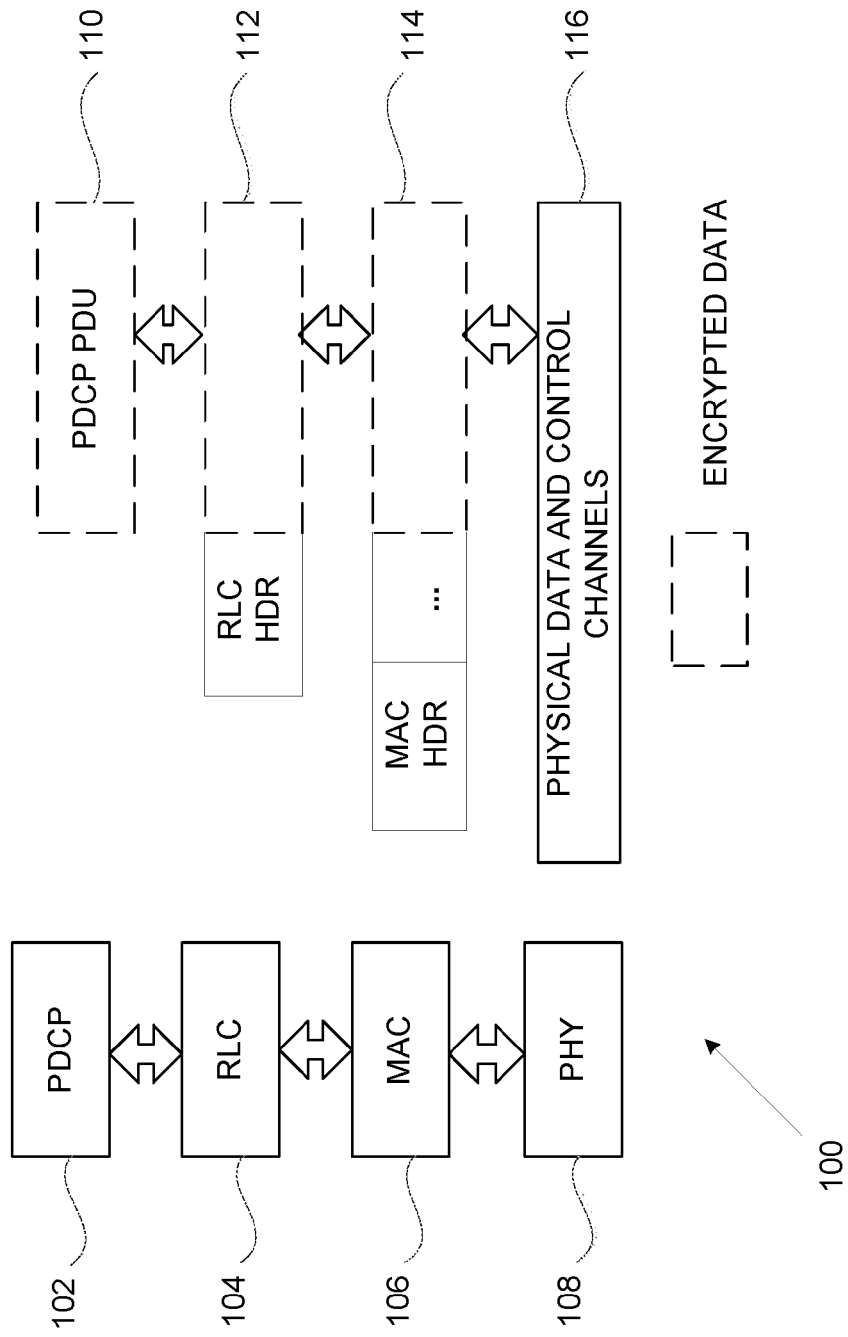
FIG. 1 illustrates a typical diagrammatic process flow depicting a process of ciphering in LTE systems where ciphering is performed at Packet Data Convergence Protocol (PDCP) layer and lower layers to add header and other data that is transmitted without any encryption.
Figure 2:
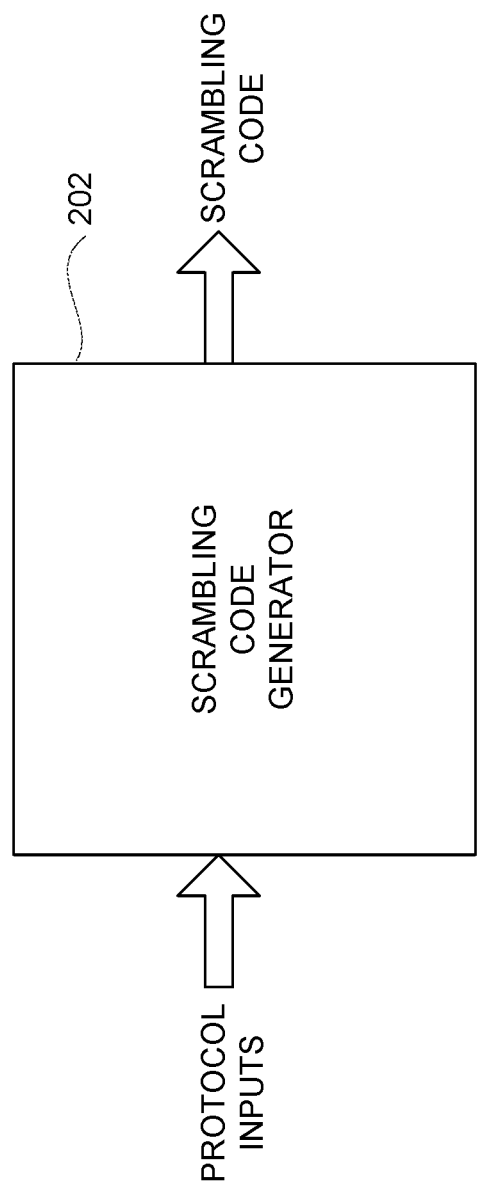
FIG. 2 illustrates a typical scrambling code generator, an output of the scrambling generator is XORed operation with the data that needs to be transmitted for randomization.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for securing wireless communication system by adding a ciphering key at a physical layer control and a data channel. Various methods and systems disclosed herein achieve this by adding the ciphering key at a physical layer control and data channels, and encrypting the physical layer control and the data channel by replacing a known scrambling code with the encrypted secure scrambling code in the physical layer control and the data channel for securing said wireless communication system. Referring now to the drawings, and more particularly to FIGS. 3 through 10, where similar reference characters denote corresponding features consistently throughout the figures, there are shown preferred embodiments.

Figure 3:
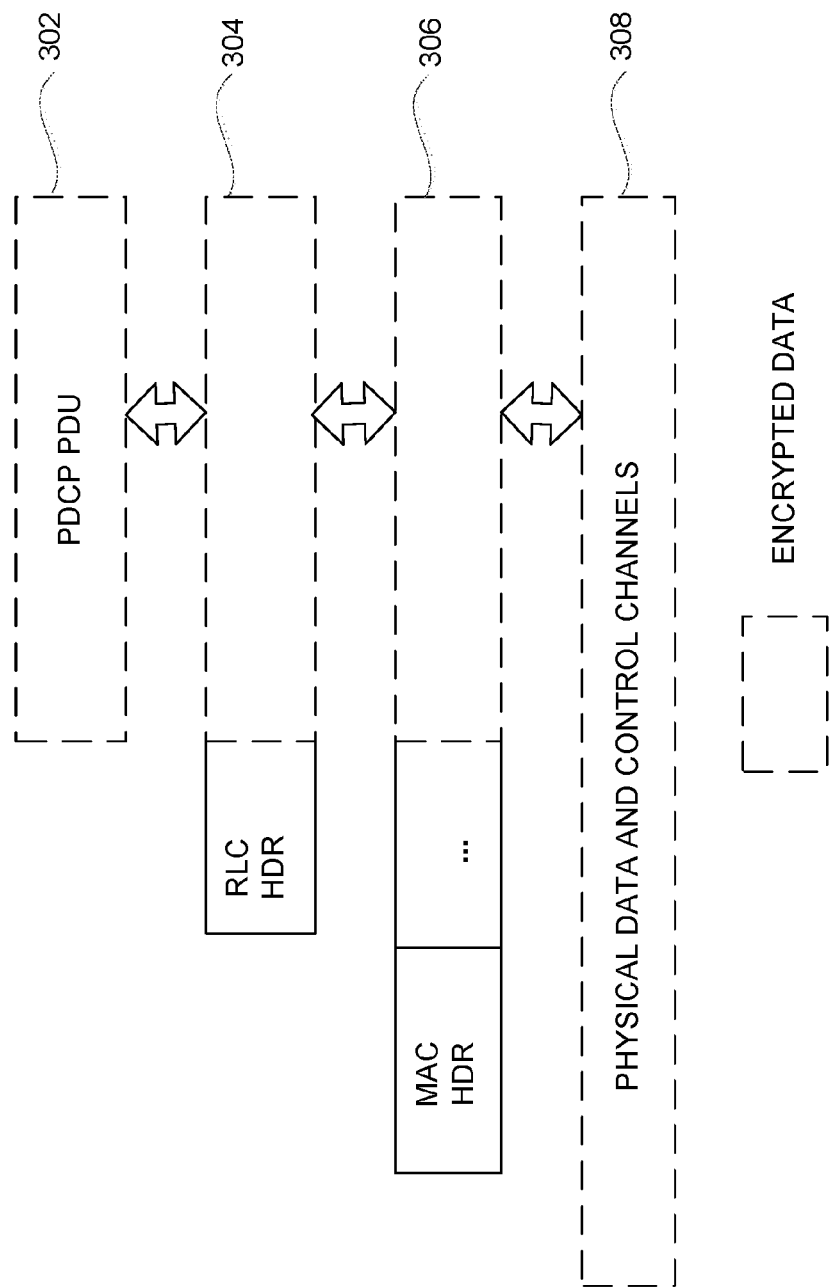
FIG. 3 illustrates a data flow diagram of a long term evolution (LTE) system that is ciphered at a physical layer to avoid transmission of the data without encryption, according to an embodiment herein.

FIG. 3 illustrates a data flow diagram of a long term evolution (LTE) system that is ciphered at a physical layer to avoid transmission of the data without encryption, according to an embodiment herein. The long term evolution (LTE) system includes protocol layers that includes Packet Data Convergence Protocol with Protocol Data Unit (PDCP PDU) 302, a RLC PDU (Radio Link Control Protocol Data Unit) with RLC HDR (Radio Link Control Header) 304, a MAC PDU (Medium Access Control Protocol Data Unit) with MAC HDR (Medium Access Control Header) 306, and a physical data and control channels 308. The (PDU) is a protocol data unit. In the long term evolution (LTE) system, ciphering may be performed at the physical layers.

Figure 4:
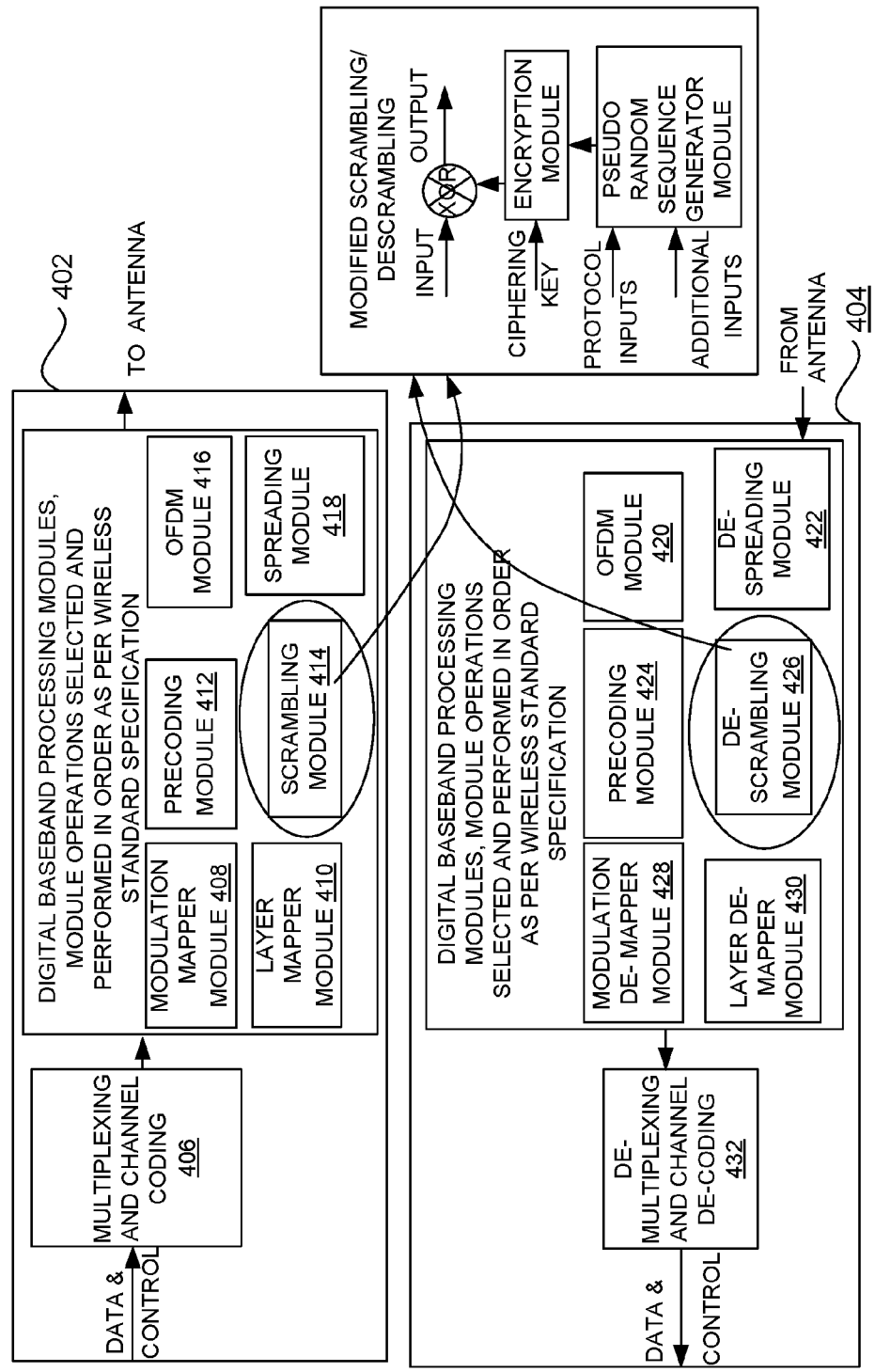
FIG. 4 illustrates an implementation of a wireless communication system with a transmitter and a receiver according to an embodiment herein.

FIG. 4 illustrates an implementation of a wireless communication system with a transmitter 402 and a receiver 404 according to an embodiment herein. The system includes a transmitter 402 and receiver 404. The transmitter includes a multiplexing and channel coding module 406, a modulation mapper module 408, a layer mapper module 410, a pre-coding module 412, an OFDM (Orthogonal frequency-division multiplexing) module 416, and a spreading module 418. The operations of the above modules are selected and performed in order as per the wireless communication standard specification. These modules function as has been disclosed in the standard wireless communication system.

The transmitter further includes a scrambling module 414. The scrambling module 414 includes a pseudo random sequence generator module and an encryption module. The pseudo random sequence generator module receives a protocol input, and an additional input. The protocol inputs may be a system frame number, or a user ID, or a radio frame number. The additional inputs may be a sequentially increasing number/counter which is incremented for each message or time period. The additional inputs may be used to change to protect against playback attacks. The protocol input, and the additional inputs determine an initial state of the pseudo random sequence generator module. The pseudo random sequence generator module generates a unique pseudo random sequence code for each initial state. The pseudo random sequence code is then fed as an unencrypted plain text input to the encryption module. The encryption module receives (i) the pseudo random sequence code and (ii) a ciphering key. The encryption module encrypts the plain text of pseudo random sequence code with the ciphering key to obtain an encrypted secure scrambling code. The ciphering key, the protocol inputs and the additional inputs are known only to a sender and a recipient and these are required to reproduce the secure scrambling code, others without access to them cannot reproduce the secure scrambling code required to descramble the secure communication.

The receiver 404 includes an OFDM (Orthogonal frequency-division multiplexing) module 420, a de-spreading module 422, a pre-coding module 424, a de-scrambling module 426, a modulation de-mapper module 428, a layer de-mapper module 430, a multiplexing, and channel coding module 432. The operations of the above modules of the receiver 404 are selected and performed in order as per the wireless communication standard specification along with any additional operations (not shown here) required for the normal performance of the receiver 404 (e.g. channel estimation module). These modules function as has been disclosed in the standard wireless communication system. In the receiver, same modification as in transmitter has been made at the de-scrambling module 426 to descramble the secure scrambling code. The above said modules of wireless communication system may be understood by an ordinary person skill in the art, and the modules of the wireless communication system may vary for different standard.

Figure 5:
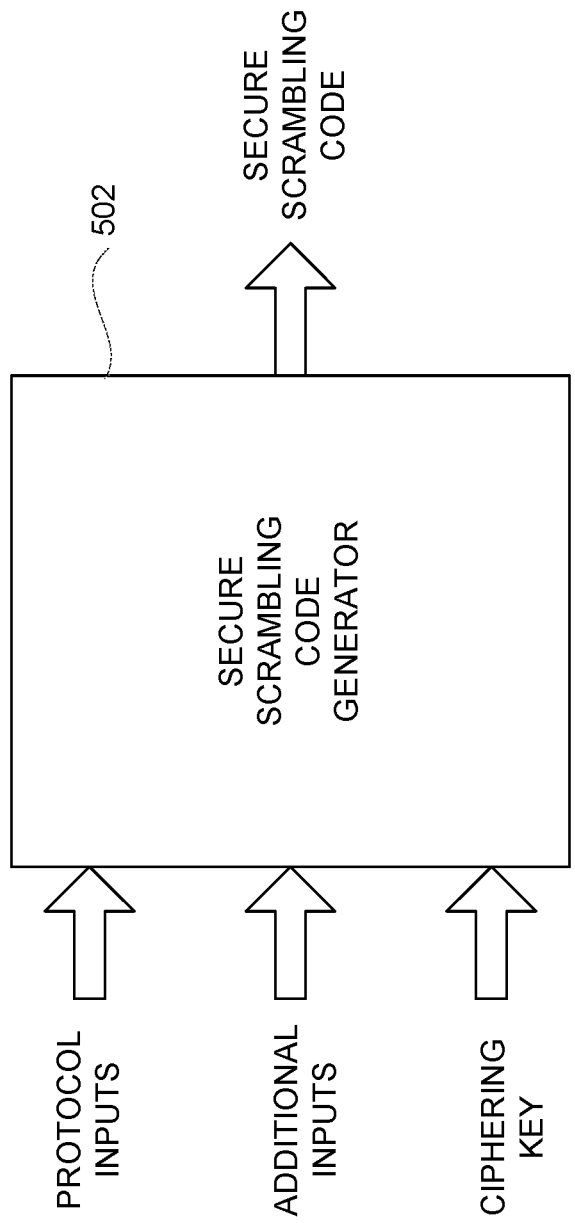
FIG. 5 illustrates a process of generating a secure scrambling code using a secure scrambling code generator according to an embodiment herein.

FIG. 5 illustrates a process of generating a secure scrambling code using a secure scrambling code generator 502, according to an embodiment herein. The secure scrambling code generator 502 receives one or more inputs. The one or more inputs may be a protocol input, an additional input, and a ciphering key. The secure scrambling code generator 502 disclosed herein generates a secure scrambling code from the received one or more inputs. In a typical wireless communication system, the scrambling code generator may be replaced with the secure scrambling code generator 502 to generate the secure scrambling code. The secure scrambling code generator 502 receives the additional inputs and the ciphering key to generate the secure scrambling code. In an embodiment, the wireless communication system may perform the step of adding the secure scrambling code generator 502, and scrambling the physical layer bits before transmission. The secure scrambling code generator 502 may support both secure and non-secure modes of communication. Hence, the secure scrambling code generator 502 with additional security to physical layer allows both secure and non-secure modes of communication to coexist in the wireless communication system.

For example, the ciphering key and the additional input are known to a sender and a recipient only, therefore an attacker without access to the ciphering key cannot generate the secure scrambling code for communication. In an embodiment, the additional inputs are employed to protect the wireless communication system against playback attacks. The additional input may be a sequentially increasing number/counter which is incremented for each message or time period. In another embodiment, a standard cryptographic method, for example, an advanced encryption standard (AES) or proprietary encryption methods may be used at the secure scrambling generator 502 to generate the secure scrambling code. In one embodiment, when the selected encryption method may include a step of producing a sequence that is subsequently applied on the data to encrypt the data. The encryption process may be stopped after sequence generation, and the sequence becomes the secure scrambling code. In another embodiment, any cryptographically secure pseudo random sequence generator may be used to first generate data which is then encrypted using the selected encryption method, and the encrypted pseudo random sequence is used as the secure scrambling code. Both a transmitter and a receiver of the wireless communication system may initialize the pseudo random sequence generator with the same seed derived from the received one or more inputs.

The strength of the security of the secure scrambling code generator method may depend on the strength of the encryption method and the quality of the ciphered keys. In an embodiment, the security of the secure scrambling code generator method may include a specific encryption method. The strength of the security of the wireless communication system also depends vitally on the ability to keep the ciphered key secret only to the transmitter and intended receiver or receivers. In an embodiment, the secure scrambling code generator method involves mechanisms to generate different types of keys securely to address different types of data. In an embodiment, the different types of keys are associated with the ciphered key.

Figure 6:
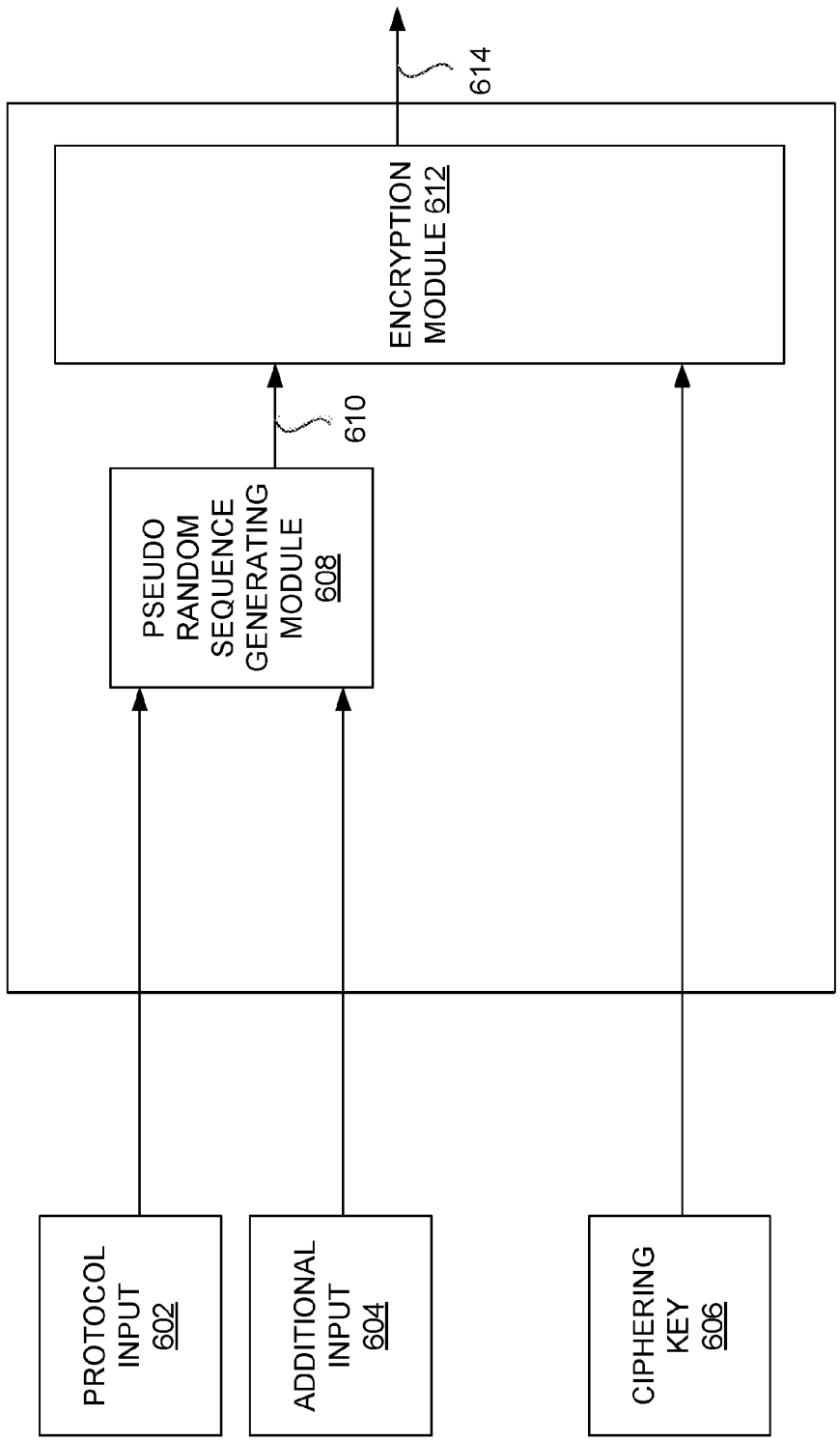
FIG. 6 illustrates an exploded view of the secure scrambling code generator 502 of FIG. 5 according to an embodiment herein.

FIG. 6 illustrates an exploded view of the secure scrambling code generator 502 of FIG. 5 according to an embodiment herein. The exploded view of the secure scrambling code generator 502 includes a pseudo random sequence generator module 608, and an encryption module 610. The pseudo random sequence generator module 608 receives a protocol input 602, and an additional input 604. The protocol input 602 may be system frame number, or a user ID, or a radio frame number. The additional input 604 may be a sequentially increasing number/counter which is incremented for each message or time period. The additional input 604 are typically changed to protect against playback attacks. The protocol input 602, and the additional input 604 may determine an initial state of the pseudo random sequence generator module 608. The pseudo random sequence generator module 608 generates a unique pseudo random sequence code 610 for each initial state. The pseudo random sequence code 610 is then fed as the unencrypted plain text input to the encryption module 612. The encryption module 612 receives (i) the pseudo random sequence code 610 as a plain text, and (ii) the ciphering key 606. The encryption module 612 encrypts the plain text input of pseudo random sequence code 610 with the ciphering key 606 to obtain an encrypted pseudo random sequence code (cipher text) 614. The cipher text same as the secure scrambling code 614. The ciphering key 606, the protocol input 602 and the additional inputs 604 are known only to a sender and a recipient. As these are required to reproduce the secure scrambling code 610, others without access to them cannot reproduce the secure scrambling code 610 required to descramble the secure communication.

Figure 7:
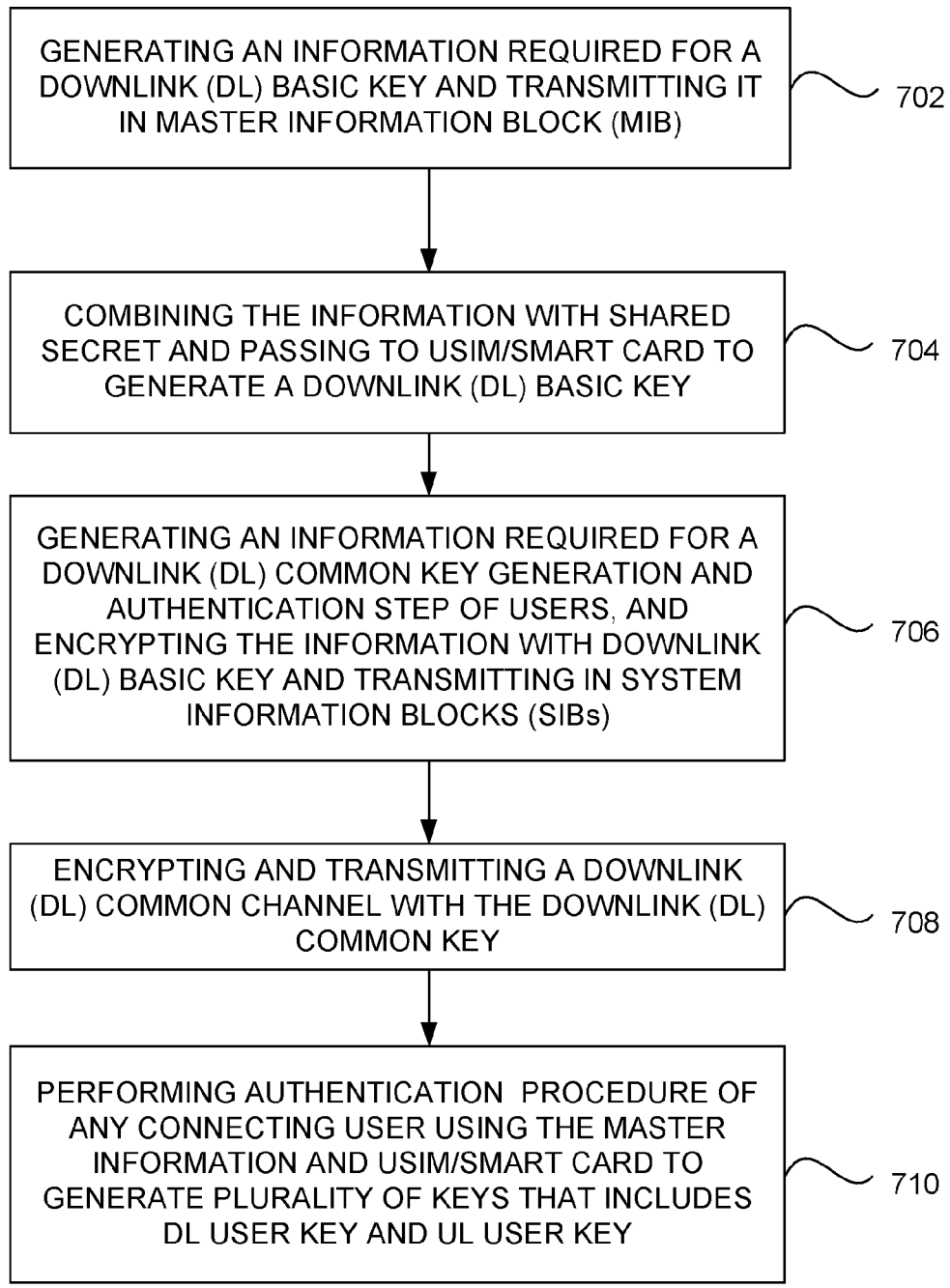
FIG. 7 is a flow diagram that illustrates a method of generating a plurality of types of keys, at transmitter, used for secure scrambling of different types of channels according to an embodiment herein.

FIG. 7 is a flow diagram that illustrates a method of generating a plurality of types of keys, at transmitter, used for secure scrambling of different types of channels according to an embodiment herein. At step 702, information required for a downlink basic key generation is generated, and transmitted in master information block (MIB). At step 704, the information is combined with shared secret, and passed to USIM (Universal Subscriber Identity Module)/smart card to generate a downlink basic key. At step 706, information required for a downlink (DL) common key generation and authentication step of users is generated, and encrypting the information that is generated with the downlink (DL) basic key and transmitting in system information blocks (SIBs). At step 708, a downlink common channel is encrypted and transmitted with the downlink (DL) common key. At step 710, authentication procedure of any connecting user is performed using generated information and USIM/smart card to generate plurality of keys that includes downlink user key and uplink user key.

Figure 8:
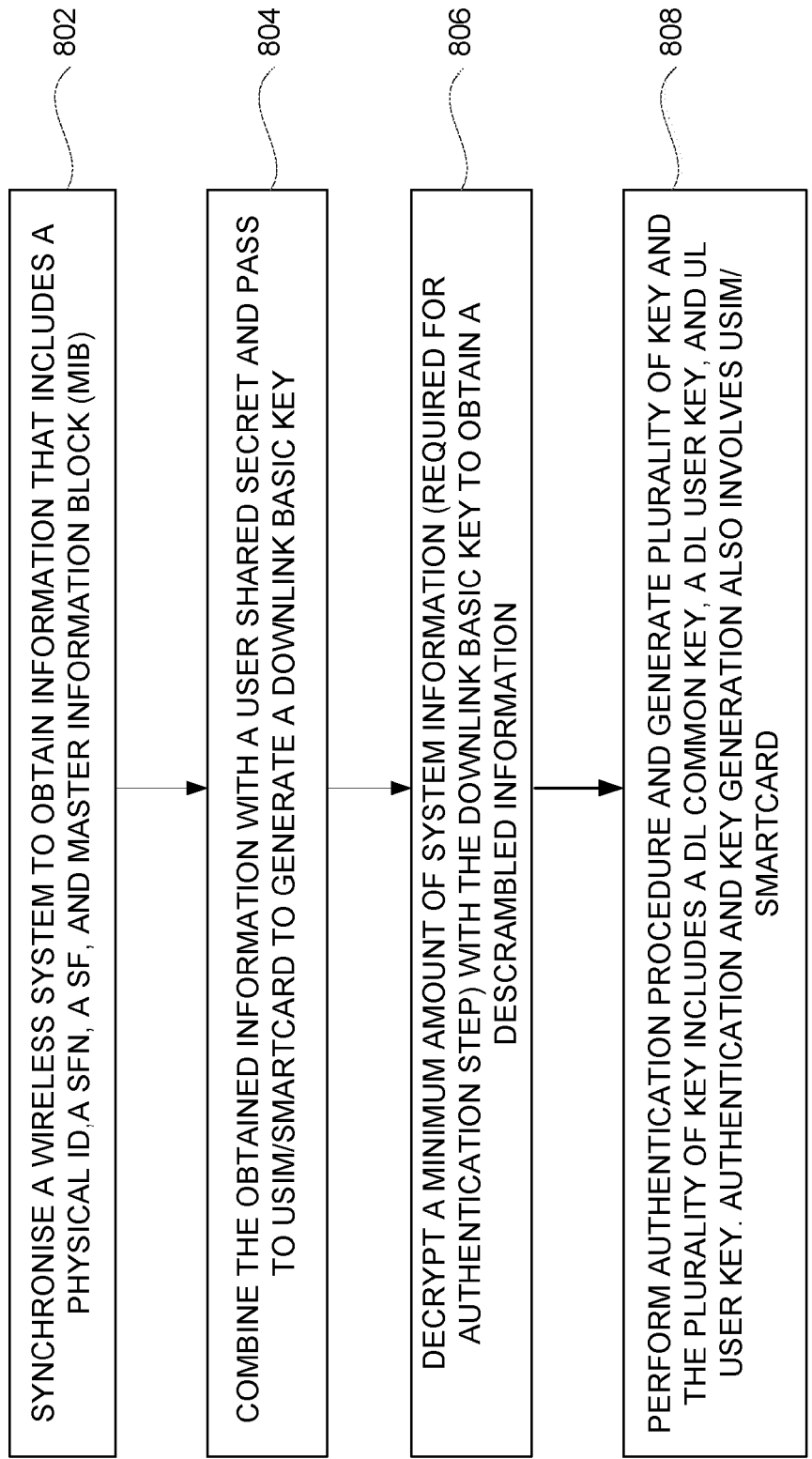
FIG. 8 is a flow diagram that illustrates a method of generating a plurality of types of keys, at receiver, used for secure scrambling of different types of channels, according to an embodiment herein.

FIG. 8 is a flow diagram that illustrates a method of generating a plurality of types of keys, at receiver, used for secure scrambling of different types of channels according to an embodiment herein. At step 802, a wireless communication system is detected by means of synchronization/beacon channel to obtain information (i.e. master information). The master information includes a physical ID, a system frame number (SFN), a sub-frame (SF), and a master information block (MIB). At step 804, the obtained information is combined with a user shared secret to generate a downlink basic key. The downlink basic key is a first level downlink key. In an embodiment, the combined information is passed onto a Universal Subscriber Identity Module (USIM) or a smartcard to generate the downlink basic key. The user shared secret may be a password or a key fob. The user shared secret may interact with the user and USIM (Universal Subscriber Identity Module)/smartcard to implement a secure key generation scheme. The key fob and a USIM/smartcard provides the highest level of security as they are resilient to attacks even if the attacker gets access to them. However some, but not all, elements of this scheme can be dropped for a trade-off between security and cost/convenience. At step 806, the downlink basic key decrypts a minimum amount of broadcast/system information required for authentication with the wireless communication system. The authentication step involves additional information obtained from the network and also the user shared secret and USIM (Universal Subscriber Identity Module) or smartcard. At step 808, one or more keys are generated through authentication of the descrambled information with the user shared secret.

FIG. 9 illustrates a tabular view of a plurality of types of keys, according to an embodiment herein. The tabular view includes a key field 902, a generated with field 904, and a used for scrambling field 906. The key field 902 includes plurality of keys. The plurality of key includes a downlink (DL) common key, a downlink (DL) user key, and an uplink (UL) user key. The downlink (DL) common key is used for scrambling the rest of the broadcast/system information, which may also include inputs needed by a secure scrambling code generator. In an embodiment, the user equipment (UE) specific downlink and uplink keys may be generated. Similarly, the additional keys for different channels or applications may be generated as per their needs. The keys may also be regenerated periodically for enhancing the security. The generated with field 904 and the used for scrambling field 906 is associated with the key 902.

Figure 10:
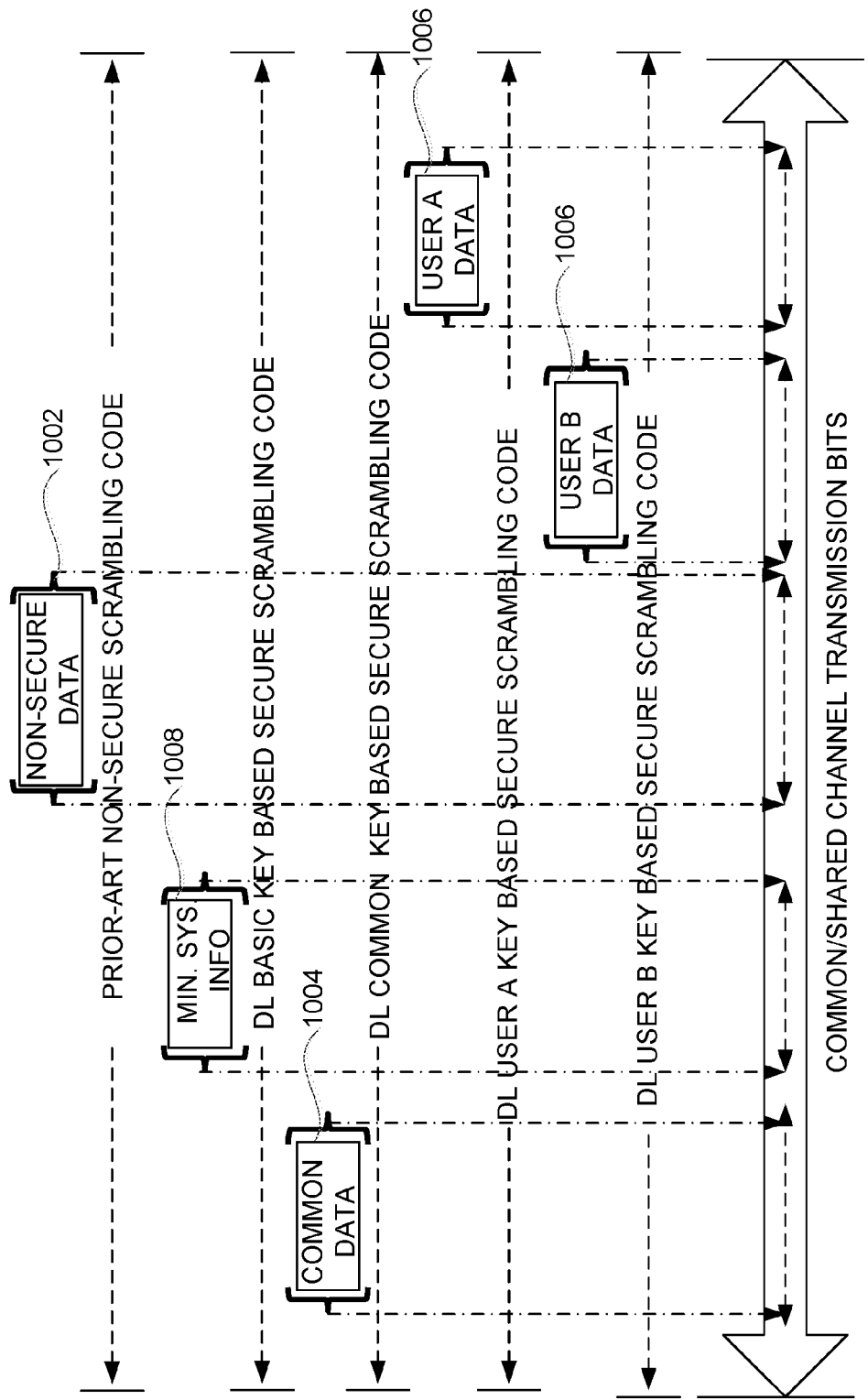
FIG. 10 illustrates process of non-secure and secure scrambling of common/shared wireless communication channels with different types of keys applied to different sections of the wireless communication channels according to an embodiment herein.

FIG. 10 illustrates a process of non-secure and secure scrambling in common/shared wireless communication channels with different types of keys applied to different sections of the wireless communication channels according to an embodiment herein. The wireless communication system uses the prior art scrambling code for non-secure data 1002 for non-secure users, thus allowing support for non-secure communications. The wireless communication systems use a secure scrambling code for a common/shared channel which carries a common control/data 1004 for multiple users. In an embodiment, data associated with a user termed as "first user data" 1006 may be transmitted in any part of the channel and so the entire channel may be descrambled by all the users. In an embodiment, different secure scrambling codes may be used for different users with minimum modification to the wireless communication system using minimum system information 1008. The data intended for different purposes may be grouped and a separate key may be used for each group. Further, the secure scrambling code for the complete length of the channel may be generated for each key, and each key may be applied only to a portion containing the data protected by the key. Differently scrambled data bits are concatenated preserving their position in the common channel and the resultant bits are transmitted in the common/shared channel.

The depicted system for the ciphering key at physical layer can recover from radio link failures as they depend only on having downlink synchronization and minimal broadcast/system information and are independent of the status of data transmission or higher layer states. The system also work with handovers as downlink synchronization and minimal broadcast/system information has to be acquired from the target cell before handover, optionally the keys may be regenerated for the target cell independently by the network and UE (user equipment) or authentication may be redone.

In an embodiment, the enablement of the ciphering key at the physical layer enhances the security by protecting lower layer data. The ciphering key at the lowest layer will protect information at all layers. The proposed system allows this to be achieved with minimal changes to the wireless communication system so it may be incorporated into the existing implementations systems easily. It also ensures that the communication and performance properties of the existing system remain unaffected.

The techniques provided by the embodiments herein may be implemented on an integrated circuit chip (not shown) and/or field-programmable gate array (FPGA). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed. The resulting integrated circuit chips may be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor.

The embodiments herein may take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein may take the form of a computer program product accessible from a computer-usable or computer-readable medium providing program code for use by or in connection with a computer or any instruction execution system. For the purposes of this description, a computer-usable or computer readable medium may be any apparatus that comprise, store, communicate, propagate, or transport the program for use by or in connection with the instruction execution system, apparatus, or device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A system for securing wireless communication between a transmitter and a receiver through a physical layer control and a data channel, wherein said system comprises:
   (a) a transmitter memory unit; and
   (b) a transmitter processor that is configured to receive a protocol input and an additional input, and initialize an initial state with said protocol input and said additional input to generate a pseudo random sequence code, wherein said pseudo random sequence code comprises plain text;
   receive a ciphering key;
   encrypt said pseudo random sequence code with said ciphering key to generate an encrypted secure scrambling code; and
   replace a known scrambling code with said encrypted secure scrambling code in said physical layer control and said data channel to encrypt said physical layer control and said data channel for securing a wireless communication system, wherein said physical layer control comprises said known scrambling code.

2. The system of claim 1, wherein said system comprises:
   (a) a receiver memory unit; and
   (b) a receiver processor, wherein said receiver processor is being configured to
      obtain a master information by detecting said system through synchronization or a beacon channel;
      generate a downlink basic key by combining a user shared secret with said master information;
      decrypt a minimum amount of broadcast or a system information required for authentication through said downlink basic key to obtain descrambled information; and
      generate plurality of keys through authentication of said descrambled information with said user shared secret.

3. A method for securing wireless communication between a transmitter and a receiver through a physical layer control and a data channel, said method comprising:
   receiving a protocol input and an additional input, at said transmitter;
   generating a pseudo random sequence code, at said transmitter, by performing initialization of an initial state with said protocol input and said additional input;
   receiving a ciphering key, at said transmitter;
   encrypting said pseudo random sequence code with said ciphering key to generate an encrypted secure scrambling code; and
   replacing a known scrambling code with said encrypted secure scrambling code in said physical layer control and said data channel to encrypt said physical layer control and said data channel for securing a wireless communication system, wherein said physical layer control comprises said known scrambling code.

4. The method of claim 3, further comprising detecting said wireless communication system through synchronization or a beacon channel to obtain a master information, at said receiver, from said physical layer control and said data channel, wherein said master information comprises at least one of a physical ID, a system frame number (SFN), a Sub-frame (SF), and a master information block (MIB).

5. The method of claim 3, comprising generating a downlink basic key, at said receiver, by combining a user shared secret with said master information, wherein said user shared secret is a password or a key fob and said downlink basic key is a first level downlink key.

6. The method of claim 3, further comprising decrypting, at said receiver, a minimum amount of broadcast or system information required for authentication through said downlink basic key to obtain descrambled information.

7. The method of claim 3, further comprising generating a plurality of keys, at said receiver, through authentication of said descrambled information with said user shared secret, wherein said plurality of keys are selected from a downlink common key, a downlink user key, and an uplink user key.

8. The method of claim 3, further comprising transmitting data that comprise said encrypted secure scrambling code associated with a first user in any part of said data channel and said data channel is descrambled by all users.

9. The method of claim 3, further comprising grouping said data intended for different purpose or users and adding a separate ciphering key for each group; and
    concatenating differently scrambled data bits preserving their position in a common channel and transmitting a resultant bit through said common channel.

10. The method of claim 3, further comprising generating said encrypted secure scrambling code for complete length of said channel for each key, wherein each secure scrambling code is applied only to a portion containing said data protected by said key.

\* \* \* \* \*